United States Patent [19]

Kemmner

[11] Patent Number: 4,566,866

[45] Date of Patent: Jan. 28, 1986

[54] AGGREGATE FOR FEEDING OF FUEL TO INTERNAL COMBUSTION ENGINE PARTICULARLY OF POWER VEHICLE

[75] Inventor: Ulrich Kemmner, Stuttgart, Fed. Rep. of Germany

[73] Assignee: Robert Bosch GmbH, Stuttgart, Fed. Rep. of Germany

[21] Appl. No.: 609,561

[22] Filed: May 11, 1984

[30] Foreign Application Priority Data

Jun. 11, 1983 [DE] Fed. Rep. of Germany ....... 3321241

[51] Int. Cl.⁴ .......................... F04B 35/04; F04D 5/00
[52] U.S. Cl. .................................. 417/366; 417/423 R;
415/53 T; 415/198.2; 415/213 T; 310/154
[58] Field of Search ........... 417/366, 410, 360, 423 R;
310/154, 89; 415/213 T, 198.2, 53 T

[56] References Cited

U.S. PATENT DOCUMENTS

| | | | |
|---|---|---|---|
| 3,418,991 | 12/1968 | Shultz et al. | 417/366 |
| 3,422,294 | 1/1969 | Parker | 310/154 |
| 3,658,444 | 4/1972 | Rhodes et al. | 417/423 R |
| 3,936,243 | 2/1976 | Gakenholz | 417/366 |
| 4,181,473 | 1/1980 | Ina | 417/366 |
| 4,445,820 | 5/1984 | Hayashi et al. | 417/366 |

*Primary Examiner*—Cornelius J. Husar
*Assistant Examiner*—Peter M. Cuomo
*Attorney, Agent, or Firm*—Michael J. Striker

[57] ABSTRACT

An aggregate for feeding of fuel from a supply container to an internal combustion engine, particularly of a power vehicle, comprises means forming a feeding chamber, a feeding pump having a feeding member rotatable in the feeding chamber, an electric drive motor for the feeding pump and having a motor armature connected with the feeding member of the feeding pump, means forming a space which surrounds the motor armature and through which a fuel flows, a weak magnetic tubular part surrounding the motor armature and having an inner wall, at least one permanent magnet having a substantially ring-segment shaped cross-section and arranged on the inner wall of the part, and an intermediate wall separating the feeding chamber from the space, the intermediate wall having a tubular projection which surrounds the part and a pocket provided on the intermediate wall inside the tubular projection for receiving a portion of the permanent magnet.

18 Claims, 6 Drawing Figures

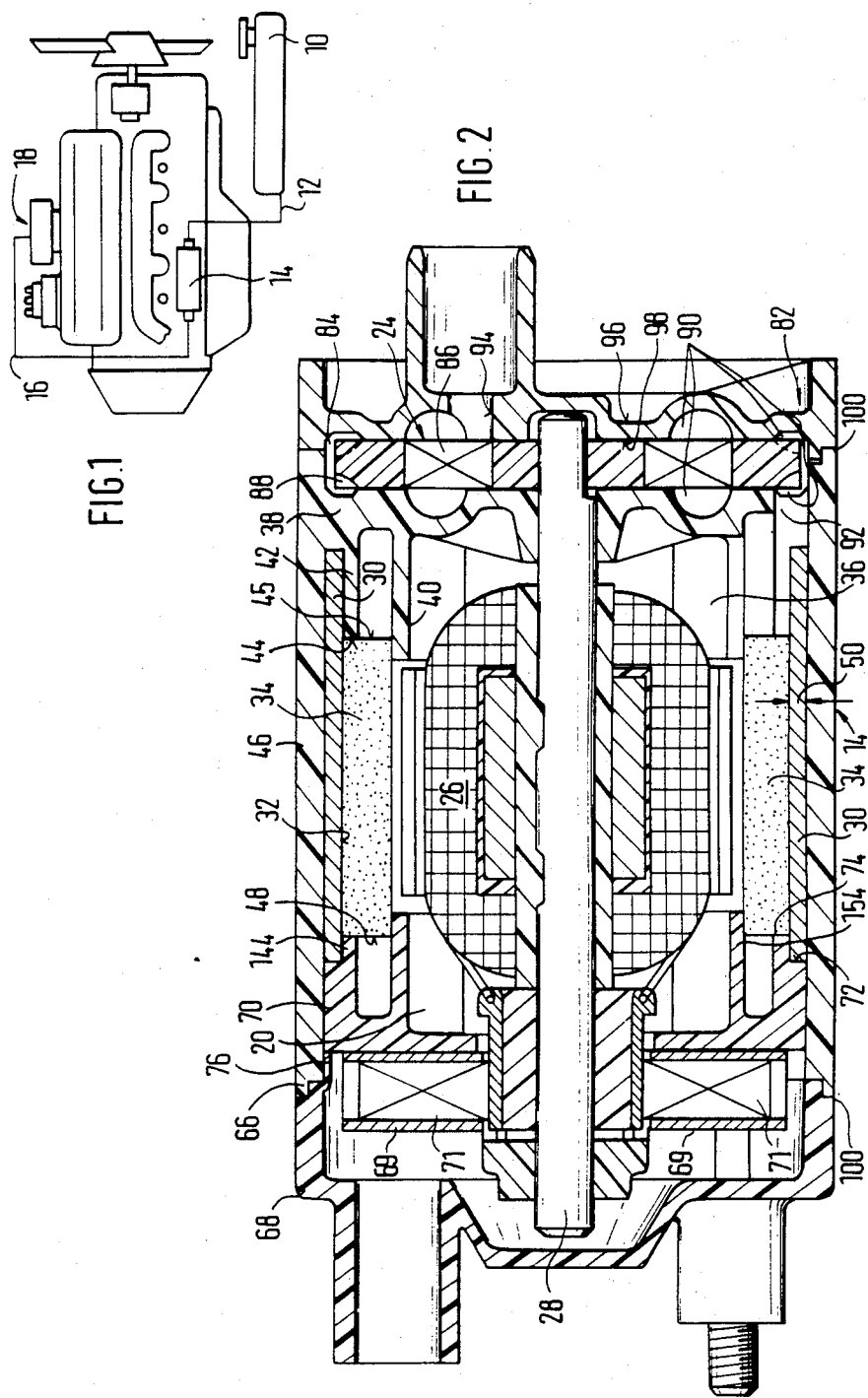

AGGREGATE FOR FEEDING OF FUEL TO INTERNAL COMBUSTION ENGINE PARTICULARLY OF POWER VEHICLE

BACKGROUND OF THE INVENTION

The present invention relates to an aggregate for feeding of fuel from a supply tank to an internal combustion engine, particularly of a power vehicle.

Aggregates of the above-mentioned general type are known in the art. In a known feeding aggregate a tubular element which serves as a part closing the magnetic circuit is formed as a part of an aggregate housing and has two openings closed by two cover parts of which one cover part is formed as an intermediate wall composed of a synthetic plastic material. Mounting of the magnetic segments on the tubular part which closes the magnetic circuit requires additional means for example holding springs, abutment shoulders, etc. which must be produced and mounted. Since the tubular member which closes the magnetic circuit simultaneously performs housing functions it must be so tight that there is no leakage in the space of the electric motor integrated in the pressure-side feed conduit. It must be, for example, deep drawn or welded. Both methods of manufacture are very expensive.

Aggregates of the above-mentioned type are also disclosed in U.S. patent applications Ser. Nos. 356,157, now U.S. Pat. No. 4,449,891, 357,561, now abandoned, 380,011, now U.S. Pat. No. 4,507,063, 424,981, now U.S. Pat. No. 4,466,781.

SUMMARY OF THE INVENTION

Accordingly, it is an object of the present invention to provide a feeding aggregate for fuel which avoids the disadvantages of the prior art.

More particularly, it is an object of the present invention to provide an aggregate for feeding of fuel in which the intermediate wall serves substantially as a frame for mounting the feeding aggregate. In keeping with these objects and with others which will become apparent hereinafter, one feature of the present invention resides, briefly stated in an aggregate for feeding fuel from a supply tank to an internal combustion engine, particularly of a power vehicle, which has an electric drive motor for a feed pump which has a displacement member connected with a motor armature and rotating in a feed chamber, a weak magnetic tubular part surrounding the motor armature and having an inner wall which mounts at least one permanent magnet having an annular-segment shaped cross-section and an intermediate wall of a synthetic plastic material separating the feeding chamber from a space which surrounds the motor armature and through which the fuel flows, wherein the intermediate wall has a tubular cross-section surrounding the weak magnetic tubular part, and a pocket is provided inside the tubular projection on the intermediate wall for receiving a portion of the permanent magnets.

Since the pipe which closes the magnetic circuit and the permanent magnets are inserted in the tubular projection or in the pocket, special additional holding means for the magnet is not needed. Another advantage of this construction is that the pipe which closes the magnetic circuit does not have housing functions and therefore can be formed very simply. It is advantageous to form the pipe closing the magnetic circuit of a sheet plate by rolling or bending of two housing shells inserted in the tubular projection of the intermediate wall. The feeding of a pressure-tight housing is performed by the tubular projection of the intermediate wall.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWING

FIG. 1 is a schematic view showing an arrangement of a fuel supply tank, a fuel feed aggregate, and an internal combustion engine;

FIG. 2 is a view showing a longitudinal section of the fuel feed aggregate of FIG. 1, on an enlarged scale, in accordance with the applicant's invention;

DESCRIPTION OF A PREFERRED EMBODIMENT

Figure 3:
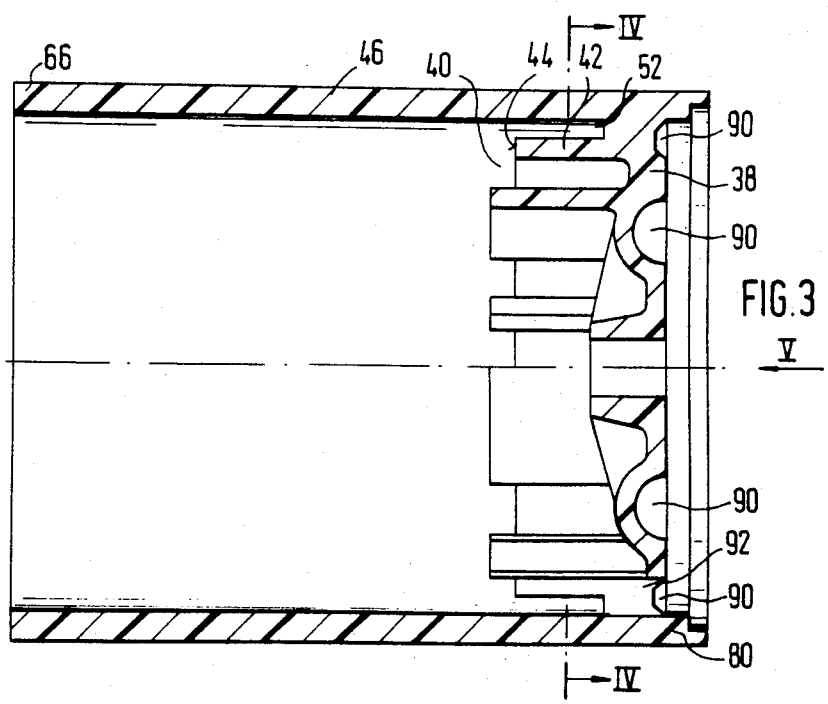
FIG. 3 is a view showing a longitudinal section of an intermediate wall arranged in the feed aggregate and provided with a tubular projection.

An aggregate for feeding of fuel is identified in FIG. 1 with reference numeral 14. A fuel supply tank 10 is connected via a suction conduit 12 with a suction side of the fuel feeding aggregate 14. A pressure conduit 16 is connected with a pressure side of the fuel feeding aggregate 14 and leads to an internal combustion engine 18. During the operation of the internal combustion engine the fuel feeding aggregate 14 conveys the fuel from the supply tank to the internal combustion engine 18.

The fuel feeding aggregate 14 has an electric drive motor 20 shown in FIG. 2 and serving for driving a feeding pump. The feeding pump has an impeller 24 which is connected for joint rotation with an armature shaft 28 of a motor armature 26. The motor armature 26 of the electric motor 20 is surrounded by a tubular weak (soft) magnetic part 30. Permanent magnets 34 are arranged on an inner wall 32 of the part 30. The permanent magnets 34 are annular-segment shaped and lie with their outer annular segment surface 36 (FIG. 4) against the inner wall 32 of the weak magnetic part 30. The part 30 forms a magnetic closure of the electric motor 20.

An intermediate wall 38 is arranged between the feeding member 24 of the feeding pump and a space 36 accommodating the motor armature 26. The intermediate wall 38 extends transverse to the axis of rotation of the motor armature 26. For securing the permanent magnets 34 on the part 30, the intermediate wall 38 is provided with a pocket 40 for each permanent magnet 34 and receives an end portion of the respective permanent magnet. For securing of the permanent magnet 34 on the part 30 in direction of the axis of rotation of the electric motor 20, a substantially ring-shaped projection 42 of the intermediate wall 38 is located in the pocket 40. Each projection 42 has an abutment shoulder 44 which cooperates with an end surface 45 of the permanent magnets 34.

The intermediate wall 38 further has a tubular projection 46 which extends concentrically to the axis of rotation of the motor armature 26 and projects over another end surface 48 of the permanent magnet 34, facing away from the first-mentioned end surface 45. The projection 42 is arranged at a distance from the tubular projection 46, determined by a wall thickness 50 of the part 30. Thereby an annular gap 52 shown in FIG. 2 is produced for receiving one end of the ferromagnetic tubular part 30.

Figure 4:
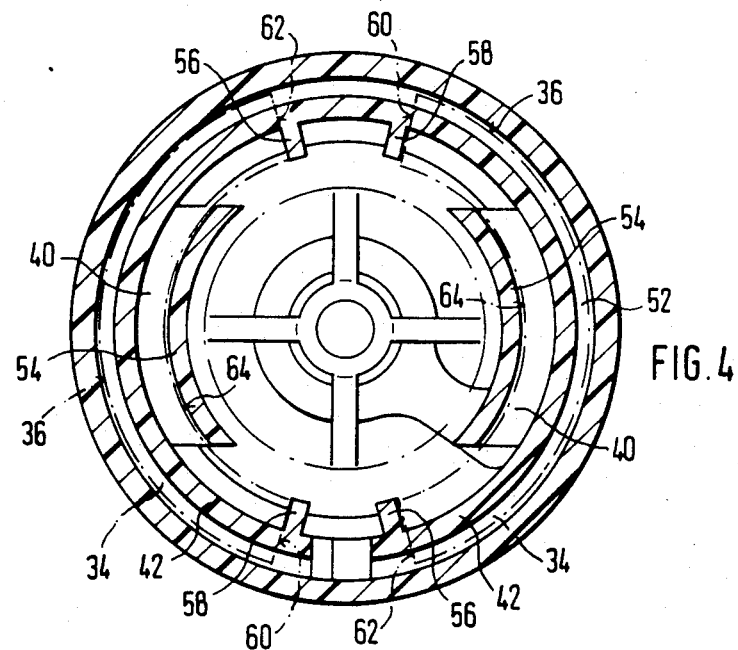
FIG. 4 is a view showing a section of the intermediate wall taken along the line IV—IV in FIG. 3.

The construction of the respective pocket 40 for the individual permanent magnet 34 is shown particularly in FIG. 4. It has a wall 54 which is elastically deflectable. It extends concentrically to the inner wall 32 of the weak magnetic part 30. The projection 42 is provided for each permanent magnet 34 with an abutment shoulder 56, 58. The abutment shoulders 56, 58 are arranged so that they cooperate with radial segment-side surfaces 60, 62 of the respective permanent magnet 34 so that the permanent magnet is secured in the circumferential direction of the part 30. For this purpose the wall 54 is elastically deflectable and arranged so that it abuts against the inner annular segment surface 64 of the permanent magnet 34 with a pre-stress. An end portion 66 of the tubular projection 46, which is remote from the intermediate wall 38, serves as a fitting receptacle for a cover part 68 closing the end portion-side opening of the tubular projection 46. The cover part 68 is simultaneously formed as a motor housing part and performs for example the bearing function for one end of the armature shaft 28 and the mounting of guides 69 for carbon brushes 71 of the electric drive motor 20.

As can further be seen from FIG. 2, a ring 70 is inserted into the end portion 66 of the tubular projection 46. The ring 70 abuts with its shoulder 72 against an end wall of the part 30, the end wall facing away from the intermediate wall 38. The ring 70 is provided for each permanent magnet 34 with a receiving pocket 74 which is associated with the other end-side end region of the respective permanent magnet 34. The receiving pockets 74 of the ring 70 are also formed with an elastic wall 154 whose construction substantially corresponds to the construction of the wall 54 on the intermediate wall 38. It is also provided with an abutment 144 which cooperates with the other end surface 48 of the permanent magnets 34.

The wall 154 is formed of one piece with the ring 70 and is elastically deflectable. Its arrangement is also selected so that it abuts with a pre-stress against the inner annular-segment surface 64 of the permanent magnets 34. The cover part 68 extends with its free supporting legs 76 into the tubular projection 46 as shown in FIG. 2 and the supporting legs 76 abut against the ring 70 at its side facing away from the permanent magnets 34. Thereby the ring 70 is clamped between the supporting legs 76 of the cover parts 68 and the end surface of the weak magnetic part 30.

The intermediate wall 38 is further provided with an annular projection 80 which extends opposite to the tubular projection 46 and surrounds the feeding member 24. A closing cover 82 is mounted on the annular projection 80. The closing cover 82 forms together with the annular projection 80 and the intermediate wall 38 a feeding chamber 84 of the feeding pump. The feeding member 24 rotates in the feeding chamber 84. The feeding pump is formed as a two-stage pump and has a rim of vane-shaped feeding elements 86 which are formed as webs and extend radially. Further, vane-shaped feeding elements 88 are provided at the periphery of the feeding member 24.

Figure 5:
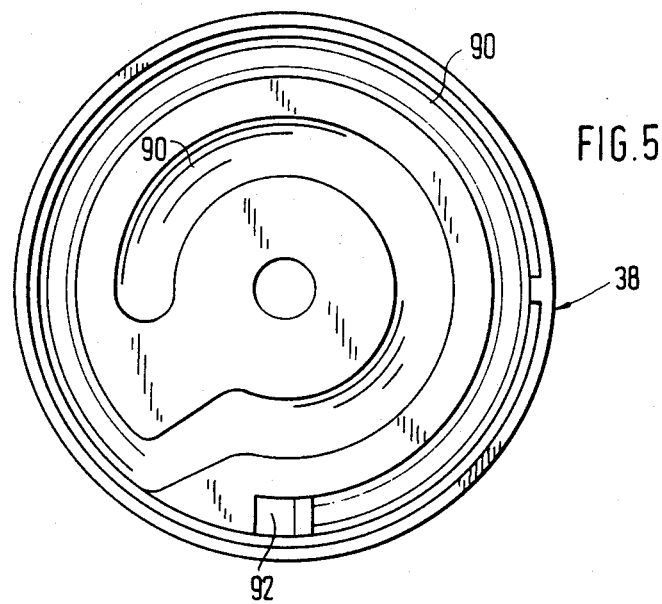
FIG. 5 is a view showing the intermediate wall of FIG. 3 as seen in direction of the arrow V.
Figure 6:
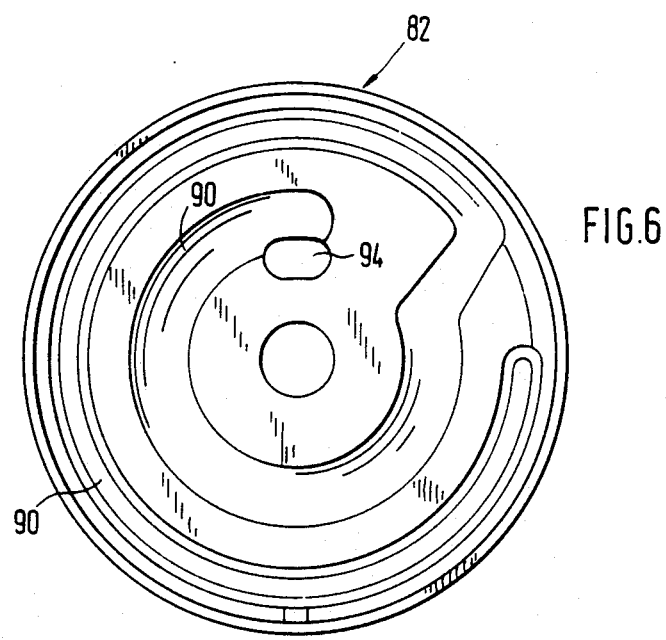
FIG. 6 is a view showing a closing cover to the feed aggregate, as seen in direction of the arrow V.

As can be particularly seen from FIG. 5, the intermediate wall 38 has a side facing toward the feeding chamber 84 and provided with a feeding passage 90. The feeding passage 90 extends from an inner annular passage associated with the feeding elements 86, into an outer annular passage cooperating with the feeding elements 88. The outer annular passage of the feeding passage 90 opens into an outlet opening 92 through which the space 36 is connected with the feeding chamber 84. The closing cover 82 also has a feeding passage which substantially corresponds to the feeding passage 90 as shown in FIG. 6. Instead of the outlet opening, the feeding passage in the closing cover 82 is provided with a suction opening 94 which opens into the inner annular passage of the feeding passage 90.

During the operation of the feeding aggregate, the medium to be conveyed is aspirated through the suction opening 94 into the feeding chamber 84, wherein it is engaged by the feeding elements 84 and thrown into the feeding passage 90. It flows from the inner annular passage into the outer annular passage until it finally reaches via the outlet opening 92 the space 36 of the electric motor. The pressure conduit 16 shown in FIG. 1 is connected with one pressure pipe of the cover part 68. The space 36 forms to some extent a part of the pressure conduit 16. A two-stage feeding pump of this type is disclosed in U.S. Pat. No. 1,635,786.

As can be seen from FIG. 2, the outer surface 96 has a contour in the cross-section which corresponds to the contour of the inner surface 98 of the closing cover 82. Therefore, the thickness of the closing cover 82 is substantially identical over its cross-section. The intermediate wall 38 with its tubular projection 46 and its annular projection 80 is composed of synthetic plastic material, as well as the cover part 68 and the closing cover 82. Thereby, it is possible to held together these elements at the respective abutment points 100 between them, for example with the aid of ultrasonic or other welding processes. Thereby a durable and pressure-tight connection between the individual parts is produced. The aggregate housing is formed by the cover part 68, the tubular projection 46, the annular projection 80, and the closing cover 82. The intermediate wall 38 forms a central part provided with receiving portions 40, 52 for the permanent magnets 34 and the magnetic circuit closing pipe 30 and with the housing walls 46, 80. The ring 70 has similar pocket for the permanent magnets and is clamped by the supporting legs 76 of the cover part 68 in the housing.

This construction of the feeding aggregate is especially favorable for mounting, since the central element composed of the intermediate wall 38, the tubular projection 46 and the annular projection 80 is formed so that the weak magnetic part 30, the magnets 34, the ring 70, the pre-mounted armature 26 and the cover part 68 must be inserted in this central element. After welding of the abutting points 100 between the tubular projection 46 and the cover part 68, the feeding member 24 and the closing cover 82 can be inserted after turning of the mounting unit. Then the other abutting points 100 between the annular projection 80 and the closing cover 82 are welded and the aggregate is completed. The welding process at the abutment points 100 can be performed without difficulties when the parts to be welded are composed for example of the same or similar synthetic plastic material.

It will be understood that each of the elements described above, or two or more together, may also find a useful application in other types of constructions differing from the types described above.

While the invention has been illustrated and described as embodied in an aggregate for feeding of fuel from a supply container to an internal combustion engine particularly of a power vehicle, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. An aggregate for feeding a fuel from a supply container to an internal combustion engine, particularly of a power vehicle, comprsing means forming a feeding chamber; a feeding pump having a feeding member rotatable in said feeding chamber; an electric drive motor for said feeding pump and having a motor armature connected with said feeding member of said feeding pump; means forming a space which surrounds said motor armature and through which a fuel flows; a weak magnetic tubular part surrounding said motor armature and having an inner wall; at least one permanent magnet having a substantially ring-segment shaped cross section and arranged on said inner wall of said part; an intermediate wall separating said feeding chamber from said space, said intermediate wall having a tubular projection which surrounds said part and a pocket provided on said intermediate wall inside said tubular projection for receiving a portion of said permanet magnet, said intermediate wall having a side facing away of said tubular projection and being provided at said side with an annular projection; and a closing cover mounted on said annular projection so that said closing cover and said side of said intermediate wall together form said means forming said feeding chamber for said feeding member of said feeding pump, said permanent magnet having another portion spaced from said first-mentioned portion, said tubular projection of said intermediate wall extending outwardly beyond said tubular part, said intermediate wall having a side facing away from said tubular projection; and a ring insertable from said side of said intermediate wall and axially abutting against said tubular part, said ring being provided with a receiving pocket for receiving the other portion of said permanent magnet.

2. An aggregate as defined in claim 1, wherein said feeding pump has a pressure side, said space being connected with said pressure side of said feeding pump; and further comprising means for connecting said space with said pressure side of said feeding pump.

3. An aggregate as defined in claim 1, wherein said permanent magnet has an end surface, said intermediate wall having an axial projection arranged in said pocket and forming an abutment shoulder for said end surface of said permanent magnet.

4. An aggregate as defined in claim 3, wherein said tubular part has a predetermined wall thickness, said projection being arranged concentrically to said tubular projection and spaced from the latter by a distance determined by said wall thickness of said tubular part.

5. An aggregate as defined in claim 1, wherein said pocket has at least one wall which is formed elastic.

6. An aggregate as defined in claim 5, wherein said permanent magnet has an inner ring-segment surface, said elastic wall of said pocket abutting against said inner ring-segment surface of said permanent magnet with a pre-stress.

7. An aggregate as defined in claim 3, wherein said permanent magnet has substantially radial segment side surfaces, said projection for said permanent magnet being provided with two abutment shoulders each co-operating with one of said substantially radial segment side surfaces of said permanent magnet.

8. An aggregate as defined in claim 1, wherein said tubular part has an end surface facing toward said ring, said ring being provided with a shoulder against which said end surface of said tubular part abuts and with an abutment for said other end surface of said permanent magnet.

9. An aggregate as defined in claim 1, wherein said receiving pocket of said ring has at least one elastically deflectable wall.

10. An aggregate as defined in claim 9, wherein said permanent magnet has an inner ring-segment surface, said wall of said receiving pocket of said ring abutting against said inner ring-segment surface of said permanent magnet with a pre-stress.

11. An aggregate as defined in claim 1, wherein said tubular projection of said intermediate wall has an end portion extending outwardly beyond said ring; and further comprising a cover part forming a fit with said end portion of said tubular projection of said intermediate wall.

12. An aggregate as defined in claim 11, wherein said ring has an end surface facing away of said permanent magnet, said cover part having at least one supporting leg cooperating with said end surface of said ring.

13. An aggregate as defined in claim 1, wherein said feeding member has feeding elements, said intermediate wall and said closing cover having sides which face toward one another and are provided with feeding passages cooperating with said feeding elements of said feeding member.

14. An aggregate as defined in claim 1, wherein said closing cover is provided with a suction opening which opens into said feeding chamber.

15. An aggregate as defined in claim 1, and further comprising a cover part, said cover part with said tubular projection and said closing cover with said annular projection being fixedly connected with one another.

16. An aggregate as defined in claim 15, wherein said cover part with said tubular projection and said closing cover with said annular projection are welded with one another.

17. An aggregate as defined in claim 1, wherein said closing cover has an outer surface and an inner surface which in a cross-section of the closing cover extends substantially in correspondence with one another so that the thickness of said closing cover is substantially identical over its cross-section.

18. An aggregate as defined in claim 1, wherein said intermediate wall is composed of a synthetic plastic material.

* * * * *